(12) United States Patent
Hanzawa et al.

(10) Patent No.: US 6,904,379 B1
(45) Date of Patent: Jun. 7, 2005

(54) THERMAL AIR FLOWMETER

(75) Inventors: Keiji Hanzawa, Mito (JP); Masahiro Matsumoto, Hitachi (JP); Shinya Igarashi, Naka (JP)

(73) Assignees: Hitachi, Ltd., Tokyo (JP); Hitachi Car Engineering Co., Ltd, Hitachinaka (JP)

( * ) Notice: Subject to any disclaimer, the term of this patent is extended or adjusted under 35 U.S.C. 154(b) by 131 days.

(21) Appl. No.: 10/221,577

(22) PCT Filed: Sep. 4, 2000

(86) PCT No.: PCT/JP00/05990

§ 371 (c)(1),
(2), (4) Date: Sep. 13, 2002

(87) PCT Pub. No.: WO02/21084

PCT Pub. Date: Mar. 14, 2002

(51) Int. Cl.[7] ............... G01F 1/00; G01F 23/00; G06F 19/00

(52) U.S. Cl. ............... 702/106; 702/45; 702/53; 702/87; 702/88

(58) Field of Search ............... 702/85, 87–88, 702/50, 53, 100, 106, 45–46, 99; 73/204.15, 204.16, 204.21

(56) References Cited

U.S. PATENT DOCUMENTS 4,261,199 A * 4/1981 Sauer et al. ............ 73/204.21
5,944,048 A * 8/1999 Bump et al. ............ 137/487.5

FOREIGN PATENT DOCUMENTS

| JP | 5-72225 | | 3/1993 | |
| JP | 8-35869 | | 2/1996 | |
| JP | 08035869 | * | 2/1996 | ............ G01F/1/68 |
| JP | 8-247815 | | 9/1996 | |
| JP | 3032513 U | | 10/1996 | |
| JP | 11094604 A | | 4/1999 | |
| JP | 11-153503 | | 6/1999 | |
| JP | 2000-2575 | | 1/2000 | |
| JP | 2000-002575 | | 1/2000 | |

OTHER PUBLICATIONS

Japanese Notice of Rejection Dated Aug. 10, 2004 and English Translation of Same (5 Total Pages).

* cited by examiner

*Primary Examiner*—Bryan Bui
(74) *Attorney, Agent, or Firm*—Crowell & Moring LLP

(57) ABSTRACT

A thermal type air flowmeter arranges a temperature-dependent heating resistance element in an air flow path and measures the air flow rate from the output of a gauge circuit containing the heating resistance element. A calculation circuit in the flowmeter is provided for correcting the output characteristic by a polynomial expression higher than a quadratic expression. Thereby, high flowmeter measuring accuracy is achieved in lieu of laser trimming and with small-scale circuit composition.

9 Claims, 10 Drawing Sheets

THERMAL AIR FLOWMETER

FIELD OF THE INVENTION

The present invention relates to a thermal type air flowmeter for detecting the air flow rate using a heating resistance element (a temperature sensitive resistance element) having temperature dependence.

DESCRIPTION OF THE PRIOR ART

A thermal type air flowmeter is used, for example, for measurement of the air flow rate such as car engine control. The conventional output adjustment is, for example, zero span adjustment by laser trimming for the resistance which is an object for adjustment of the circuit (IC chip) of the air flowmeter (for example, Japanese Application Patent Laid-open Publication No. Hei 8-247815). The laser trimming adjustment method is further described in, for example, Japanese Application Patent Laid-open Publication No. Hei 5-72225.

Further, also for sensors other than the air flowmeter, output adjustment is executed and for example, in the pressure sensor described in Japanese Application Patent Laid-open Publication No. Hei 11-153503, in place of the laser trimming adjustment, variations in the output characteristics and machine differences are corrected by calculation. This conventional example has a microcomputer for executing a calculation expression for correction and checks and stores beforehand the correction coefficients (constants a to f) used in the calculation expression. In this prior art, it is described that the variation factors of the sensor are corrected by six coefficients (for example, temperature coefficient), which are all primary coefficients.

The output of the air flowmeter indicates a non-linear (curve) characteristic. The zero span adjustment method by the current adjustment method (resistance laser trimming) is linear two-point adjustment, so that an error (an error to the target output characteristic) due to the characteristic bend at other than the adjustment points is caused.

This error is a one almost satisfying the current exhaust gas regulation for car engines. However, in consideration of the exhaust gas regulation becoming severe more and more in the future., it is desired to bring the output characteristic closer to the target characteristic, improve the accuracy of a thermal type air flowmeter, and improve the control of air-fuel ratio as well.

The present invention is intended to realize high accuracy of a thermal type air flowmeter by a method in place of laser trimming and moreover with small-scale circuit composition.

SUMMARY OF THE INVENTION

The present invention, to accomplish the above object, is structured as indicated below.

(1) One of them is that in a thermal type air flowmeter that a heating resistance element having temperature dependence is arranged in an air flow path and the air flow rate is measured from output of a gauge circuit having the heating resistance element, the output characteristic is corrected by a polynomial expression higher than a quadratic expression (for example, a multidimensional polynomial expression of one of a cubic expression to a quintic expression) using a calculation circuit.

Further, for the aforementioned calculation circuit, a one which is composed of a circuit for executing zero point adjustment, span adjustment, and non-linear adjustment by the calculation expression sequentially or simultaneously or executing span adjustment and non-linear adjustment simultaneously after zero point adjustment and has a means for storing the correction coefficients decided after each adjustment mentioned above is proposed.

(2) As another one, a method that a thermal type air flowmeter has map data concerning air flow rate—output characteristic, and the region of the map data is divided, and an output characteristic correction expression to be changed for each air flow rate region is prepared, thus the air flow rate is calculated is proposed.

DESCRIPTION OF THE PREFERRED EMBODIMENTS

The embodiments of the present invention will be explained with reference to the accompanying drawings.

Figure 1:
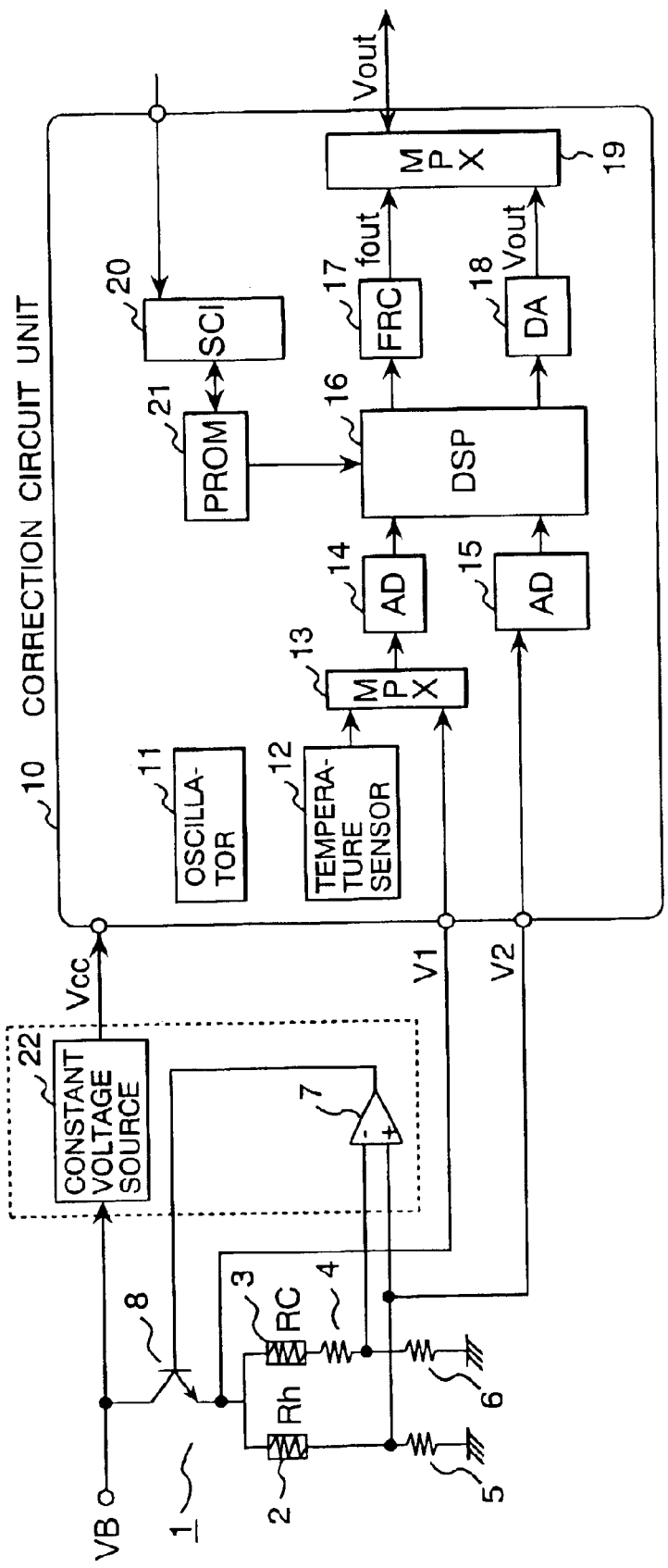
FIG. 1 is a circuit block diagram concerning the first embodiment relating to the thermal type air flowmeter of the present invention.

A gauge circuit 1 of the air flowmeter shown in FIG. 1 has a bridge circuit composed of a heating resistance element 2, a temperature measurement resistance element 3 for intake air temperature correction and resistance elements 4 to 6. Furthermore, the circuit 1 has an operational amplifier 7, and a transistor 8 for current control.

The heating resistance element 2 and the temperature measurement resistance element 3 are composed of a temperature sensitive resistance element having so-called temperature dependence for changing the resistance depending on temperature, and these resistance elements are of various types of wire, film, and semiconductor. The heating resistance element 2 has a resistance lower than that of the temperature measurement resistance element 3 so as to flow a heating current.

The output of the heating resistance element 2 is detected by the fixed resistance element 5 and input to the +(plus) terminal of the operational amplifier 7, while the output of the temperature measurement resistance element 3 is detected by the fixed resistance element 6 and input to the −(minus) terminal of the operational amplifier 7. The output of the operational amplifier 7 is input to the base of the transistor 8. By use of such circuit composition, the heating current flowing in the heating resistance element 2 is controlled so as to make the temperature difference (resistance difference) between the heating resistance element 2 and the temperature measurement resistance element 3 constant.

The heating resistance element 2 is arranged in the intake air path of the engine, so that heat is taken by air passing the intake air path, and the heating current changing depending on the air flow rate is detected as an electric signal, thus the air flow rate can be measured.

The electric signal of the heating current is converted into an output value of V2 by the resistance element 5. The detection signal V2 is expressed, for example, by Expression (1) from the King's expression.

$$V_2 = R_1 Ih = R_1 \sqrt{\frac{1}{Rh}(A + B\sqrt{Q})\Delta Th} \tag{1}$$

Wherein R1 indicates a resistance of the detection resistance element 5, Ih is a heating current flowing in the heating resistance element 2. Rh is a resistance of the heating resistance element 2, A and B are thermal constants, Q is an air flow rate, and ΔTh is a temperature difference between the heating resistance element 2 and the temperature measurement resistance element 3.

Figure 11:
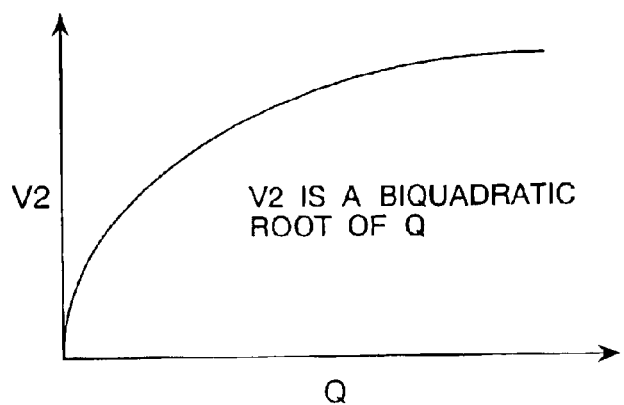
FIG. 11 is an output characteristic diagram of a conventional thermal type air flowmeter.

The detection signal V2 is a biquadratic root of the air flow rate Q and expressed by the characteristic curve shown in FIG. 11.

The detection signal V2 varies in characteristic for each circuit, so that it is necessary to be adjusted so as to get close to the target output characteristic. As described already, the characteristic of the detection signal (output) V2 is a biquadratic root of the air flow rate Q, so that when the output characteristic is to be adjusted or corrected by calculation, it is preferable to adjust the correction coefficient of the output characteristic by a polynomial expression of a biquadratic expression or of a cubic expression or a quintic expression close to it. The output characteristic of this embodiment is adjusted by calculation of a multidimensional polynomial expression and it is executed before mounting the air flowmeter. The output adjustment is to obtain a correction coefficient of a calculation expression for correcting the output.

The output adjustment and correction of the detection signal V2 in this embodiment are executed by calculation of a correction circuit unit 10 which will be described hereunder.

Further, the adjustment (that is, setting of a correction coefficient) is executed with the correction circuit unit 10 connected to an external computer at the time of adjustment.

The correction circuit unit 10 is an LSI circuit with a calculation function, having an oscillator 11 for driving the whole circuit, a temperature sensor 12 for detecting the temperature of the circuit chip, a multiplexer 13 for selectively fetching a signal of the temperature sensor 12 and the voltage V1 of the heating resistance element 1 on the upstream side (the voltage between the emitter of the transistor 8 and the heating resistance element 1), an A-D converter 14 for converting the output of the multiplexer 13 from analog to digital, a converter for converting the air flow rate detection signal (output) V2 from analog to digital, a calculation circuit (a digital signal processor, hereinafter referred to as DSP) 16 used for adjustment and correction of the output V2, a free running counter (hereinafter referred to as FRC) 17 for converting a digital output value Vout calculated by the DSP 16 into the frequency, a D-A converter 18 for converting the digital output value Vout from digital to analog, a multiplexer 19 for selecting a frequency conversion signal or a D-A signal, an adjustment data writing communication circuit (a serial communication interface, hereinafter referred to as SCI) 20 connected with an external computer for executing output adjustment (calculating a correction coefficient of air flow rate), and a storage circuit (for example, PROM) 21 for writing the adjustment data (the correction coefficient). The drive power source for the correction circuit unit 10 is a constant-voltage source 22.

Figure 2:
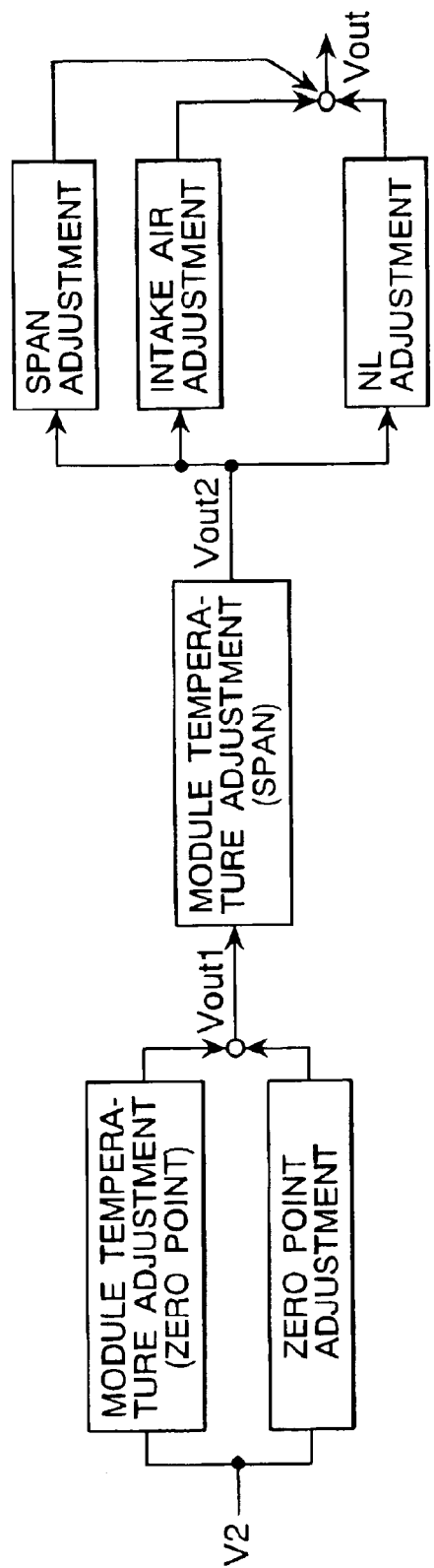
FIG. 2 is a function block diagram of the calculation circuit for executing output adjustment and output correction among the circuits shown in FIG. 1.

The DSP 16 in this embodiment has an output adjustment function as shown in FIG. 2.

The output adjustment function shown in FIG. 2 is basically a calculation circuit for executing span adjustment and non-linear adjustment simultaneously after zero point adjustment, and it takes in the module temperature of the thermal type air flowmeter (temperature of the correction circuit unit 10) and the intake air temperature as adjustment elements of the output characteristic (zero adjustment of the module temperature and span adjustment of the module temperature). The reason for taking in these temperatures as adjustment elements is that the output characteristic of the air flowmeter is adversely affected by these temperatures.

The output adjustment in this embodiment means obtaining a correction coefficient used in a calculation expression for correcting the output.

Next, the basic principle of the adjustment calculation expression (correction calculation expression) of the thermal type flowmeter adopted by the present invention will be explained by referring to FIG. 8.

Figure 8A:
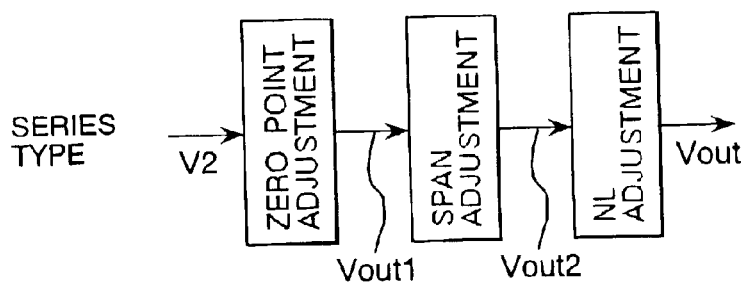
FIG. 8 is a principle illustration for the output adjustment of the present invention.
Figure 8B:
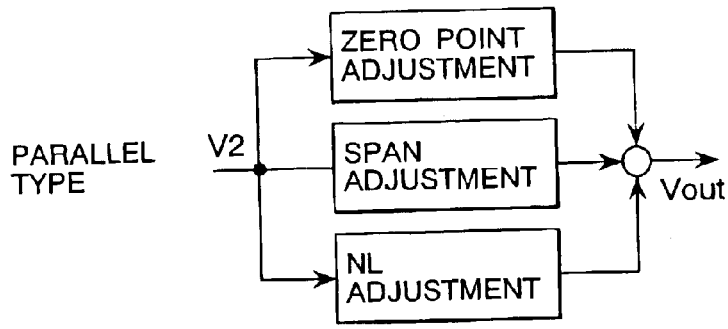
Figure 8C:
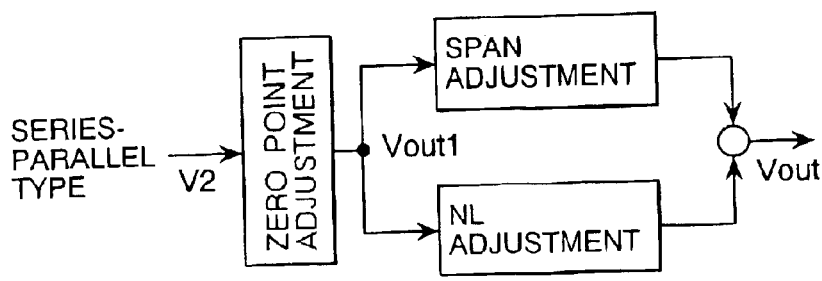

FIG. 8(a) is a drawing of a series type of sequential execution of zero point adjustment, span adjustment, and non-linear adjustment, and FIG. 8(b) is a drawing of a parallel type of simultaneous execution of those adjustments, and FIG. 8(c) is a drawing of a series-parallel type of simultaneous execution of span adjustment and non-linear adjustment after zero point adjustment. The embodiment shown in FIG. 2 basically adopts the series-parallel type.

The series type shown in FIG. 8(a) obtains Vout1 by firstly executing the zero point adjustment for the output value V2 from the gauge circuit, obtains Vout2 next by executing the span adjustment (inclination adjustment of the output), and then obtains final Vout by executing the non-linear adjustment (NL adjustment). This is expressed by Calculation Expression (2).

$Vout1=V2+k1$ $Vout2=k2*Vout1$ $Vout=Vout2+k3*Vout2*Vout2+k4*Vout2*Vout2*Vout2 \tag{2}$ Wherein K1 indicates a coefficient of zero point adjustment (correction coefficient), and K2 indicates a coefficient of span adjustment (correction coefficient), and K3 and K4 indicate coefficients of non-linear adjustment (correction coefficients). This calculation adopts a three-dimensional polynomial expression. Symbol * in the calculation expression indicates multiplication.

The parallel type shown in FIG. 8(b) simultaneously executes the zero point adjustment, span adjustment, and non-linear adjustment, so that the output value Vout after adjustment is expressed by a three-dimensional polynomial expression of Expression 3.

$$Vout = k1 + k2*V2 + k3*V2*V2 + k4*V2*V2*V2 \quad (3)$$

The series-parallel type shown in FIG. 8(c) obtains Vout1 by firstly executing the zero point adjustment for the output value V2 and then obtains Vout from the calculation expression of the span adjustment and non-linear adjustment. The output value Vout after adjustment in this case is expressed by a three-dimensional polynomial expression of Expression (4).

$$Vout1 = V2 + k1$$

$$Vout = k2*Vout1 + k3*Vout1*Vout1 + k4*Vout1*Vout1*Vout1 \quad (4)$$

The characteristics of these adjustment methods will be described after the adjustment method for the output characteristic is explained by referring to FIG. 3.

At the time of adjustment of the characteristic of the output V2, the coefficients of the calculation expressions (for example, the coefficients K1 to K4 in Expressions (2) to (4)) are not decided yet and there exist the initial values (initial coefficients) of those coefficients for the present.

Therefore, the output V2 of the thermal type air flowmeter becomes the output Vout on the basis of the calculation expression using the initial coefficients (in FIG. 1, the DSP 16 performs calculations) and the output Vout is input to an external computer (not shown in the drawing) for output adjustment (for calculation of the correction coefficients) via the FRC 17 or DA 18 and the multiplexer 19.

The external computer is connected to the circuit of the thermal type air flowmeter only at the time of output adjustment. At the time of adjustment, air is let flow at the known air flow rates at the four points, and the outputs V2 at the four points are sampled (the reason of sampling data at four points is that the correction calculation expression is a three-dimensional polynomial expression) and the external computer, on the basis of the sampling data (hereinafter may be referred to as initial characteristic output), obtains correction coefficients (in the example shown in FIG. 8, the correction coefficients K1 to K4) closest to the target output characteristic.

Figure 3:
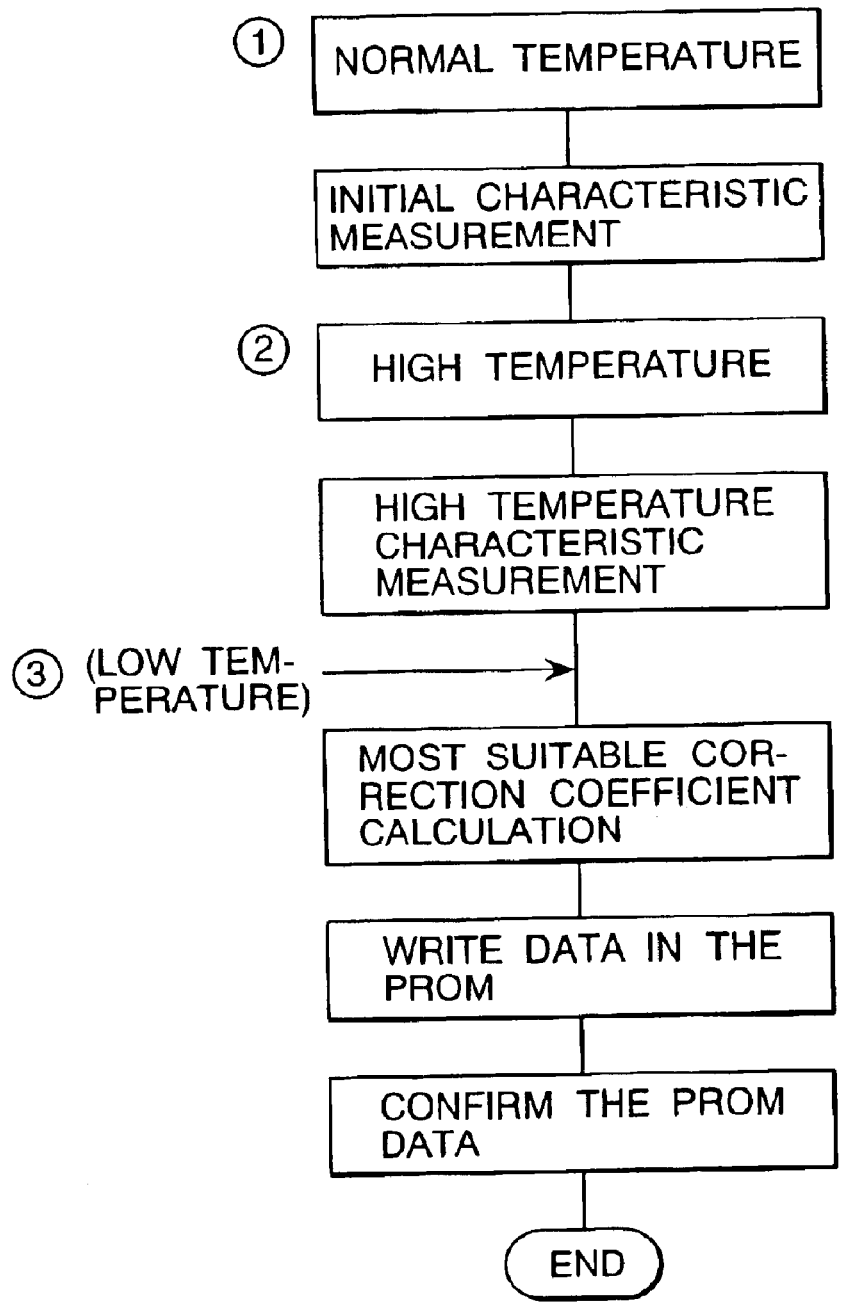
FIG. 3 is a flow chart concerning the output adjustment of the first embodiment.

In this embodiment, as shown in FIG. 3, the normal temperature is set first in the process (1), and the DSP 16 calculates the initial characteristic output Vout of the output V2 of the air flowmeter at four points of (Q1, Vout1), (Q2, Vout2), (Q3, Vout3), and (Q4, Vout4), and then in consideration of changes in the output characteristic when the circuit temperature and intake air temperature are changed, the DSP 16 calculates the initial characteristic output Vout' of the output V2', when a high temperature is set in the process (2), at the four points in the same way as with the aforementioned, and the process (3) is executed as required, and the DSP 16 calculates the initial characteristic output Vout" of the output V2", when a low temperature is set, at the four points, and the external computer, on the basis of the calculated values (sampling data), calculates most suitable correction coefficients closest to the target characteristic. The calculated most suitable correction coefficient data is stored in the PROM 21 from the external computer via the SCI 20. Hereafter, the external computer is separated and in a mounting state of the air flowmeter, on the basis of the correction coefficients stored in the PROM 21, the output V2 is corrected by the calculation expressions of the adjustment function shown in FIGS. 8 and 2.

Figure 12:
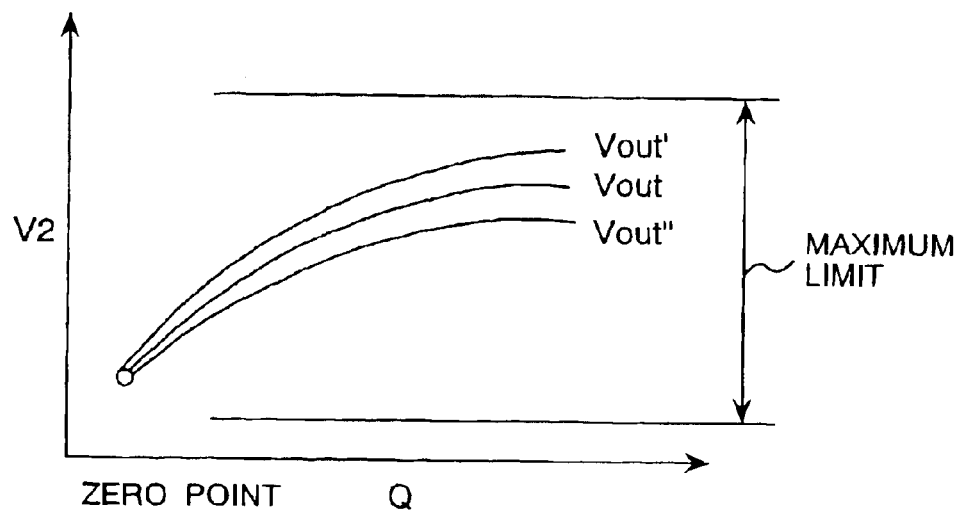
FIG. 12 is an illustration showing characteristics of series output adjustment.

When the output is to be adjusted like this on the basis of the initial characteristic outputs Vout, Vout', and Vout" (sampling data) under plural temperature conditions, the series type shown in FIG. 8(a) executes the zero point adjustment first, so that, as shown in FIG. 12, there is an advantage that the respective initial characteristic outputs Vout, Vout', and Vout" are hardly clamped at the maximum output limit of the circuit. However, the series calculation has a disadvantage that the calculation for obtaining the correction coefficients is hardly converged.

Figure 13:
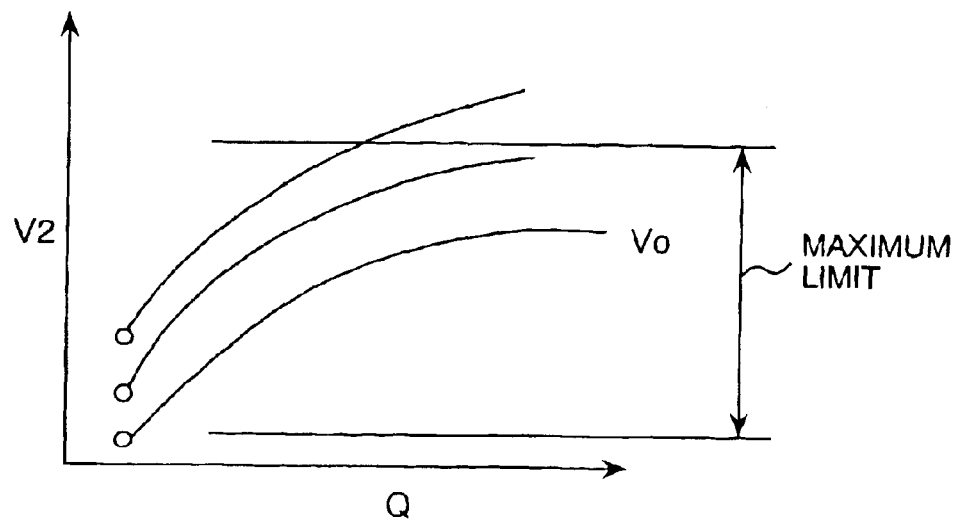
FIG. 13 is an illustration showing characteristics of parallel output adjustment.

On the other hand, the parallel type shown in FIG. 8(b) does not execute the zero point adjustment first, so that the respective initial characteristic outputs Vout, Vout', and Vout" are scattered as shown in FIG. 13, thus there is a disadvantage that they are easily clamped at the maximum output limit of the circuit. However, the parallel calculation has an advantage that the calculation for obtaining the correction coefficients is easily converged.

The series-parallel type shown in FIG. 8(c) has an advantage that it uses the good points of the series type and parallel type, is hardly clamped at the maximum limit, and is easily converged.

In this embodiment, the series-parallel type is used as a base and further to realize highly accurate adjustment and correction of the output characteristic of the thermal type air flowmeter, as shown in FIG. 2, the circuit temperature (module temperature) and intake air temperature are added as adjustment elements. The circuit temperature Tm is detected by the temperature sensor 12 as already mentioned and input to the DSP 16 via the multiplexer 13 and the A-D 14. The intake air temperature Ta is calculated by the DSP 16 using a calculation expression (for example, Expression (5)) using the output values V1 and V2 at both ends of the heating resistance element 2 as variables.

$$Ta\{(V1-V2)/V2*R1/Rh_0 - 1\}/\alpha - \Delta Th \quad (5)$$

Wherein $\alpha$ indicates a temperature coefficient of the heating resistance element, and $\Delta Th$ indicates a temperature difference between the heating resistance element and the temperature measurement resistance element, and RhO indicates a resistance of the heating resistance element at 0° C.

In FIG. 2, the zero point adjustment for the output V2 and the zero point adjustment of the module temperature are executed firstly (this adjustment output is assumed as Vout1), thereafter the span adjustment of the module temperature is executed (this adjustment output is assumed as Vout2), and then the output span adjustment, intake air temperature adjustment, and non-linear adjustment are executed simultaneously. The calculation expression for executing this adjustment function is expressed by Expression (6).

$$Vout1 = V2 + (k1 + k2*Tm + k3*Tm*Tm)$$

$$Vout2 = (1 + k4*Tm + k5*Tm*Tm)*Vout1$$

$$Vout = k6*Ta + (k7*Ta + kB)*Vout2 + (k9)*Vout2*Vout2 + (k10)*Vout2*Vout2*Vout2 \quad (6)$$

Wherein k1 indicates a correction coefficient of the zero point adjustment, and K2 and K3 indicate correction coefficients of the module temperature used for the zero point adjustment, and K4 and K5 indicate correction coefficients of the module temperature used for the span adjustment, and K6 and K7 indicate correction coefficients of the intake air temperature used for the span adjustment and non-linear adjustment, and K8 to K10 indicate correction coefficients used for the non-linear adjustment.

After output adjustment, the correction coefficients K1 to K10 are stored in the PROM 21. The air flowmeter is mounted in a car after output adjustment. When the output V2 of the air flowmeter is corrected, the correction coefficients K1 to K10 stored in the PROM 21 are applied to the adjustment function [the calculation expression of Expression 6)] shown in FIG. 2 and the correction is executed.

The output after this correction is input to the engine control unit via the D-A circuit 18, the multiplexer 19, and an A-D circuit not shown in the drawing, and used as a parameter of the calculation expression of fuel jet rate.

Figure 4:
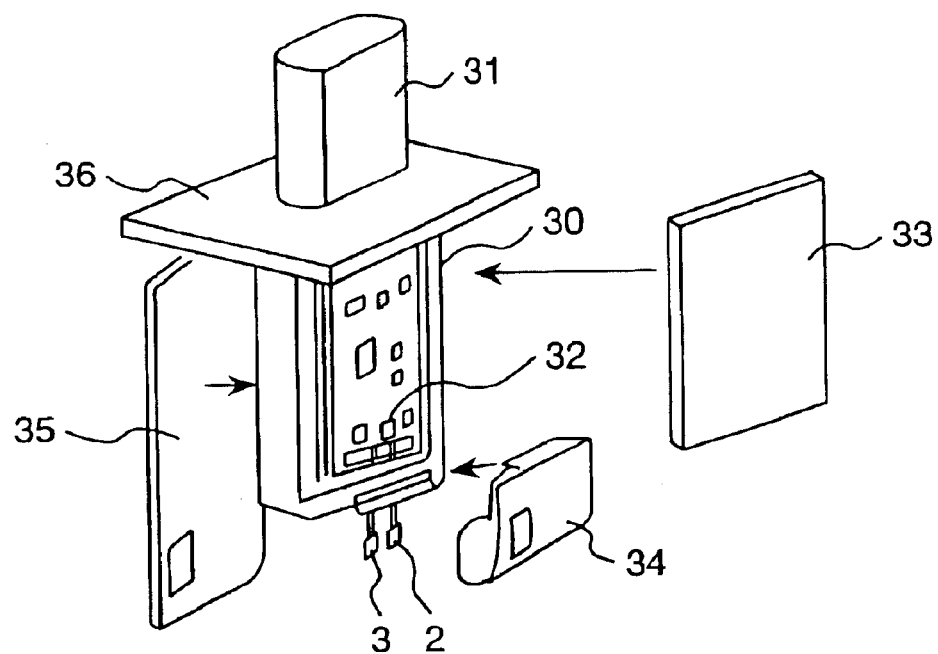
FIG. 4 is an exploded perspective view of the air flowmeter used in the first embodiment.

In the air flowmeter of this embodiment, as shown in FIG. 4, a sensor housing 30 and a connector case 31 are integratedly formed, and a circuit substrate 32 with the circuit elements (the heating resistance element 2 and the temperature measurement resistance element 3 are excluded) shown in FIG. 1 is mounted inside the sensor housing 30, and the sensor housing 30 is covered with the cover 31. The heating resistance element 2 and the temperature measurement resistance element 3 are supported by the holder pins protruded from the bottom of the sensor housing 30 and stored in a member 34 constituting the sub-path of the intake air path. Numeral 35 indicates a base of the sensor housing 30. The air flowmeter body having such a constitution is mounted in the intake air path of the engine via a flange 36 formed together with the sensor housing 30 and set so that the sensor housing 30, the sub-path 34, the heating resistance element 2, and the temperature measurement resistance element 3 are positioned in the intake air path. The sensor housing 30 may be positioned on the outer wall of the intake air path, and in place of obtaining the intake air temperature Ta by the calculation expression, the intake air temperature Ta may be detected by actually using a sensor. In this case, for example, an intake air sensor is arranged on the upstream side of the heating resistance element 2.

Figure 5:
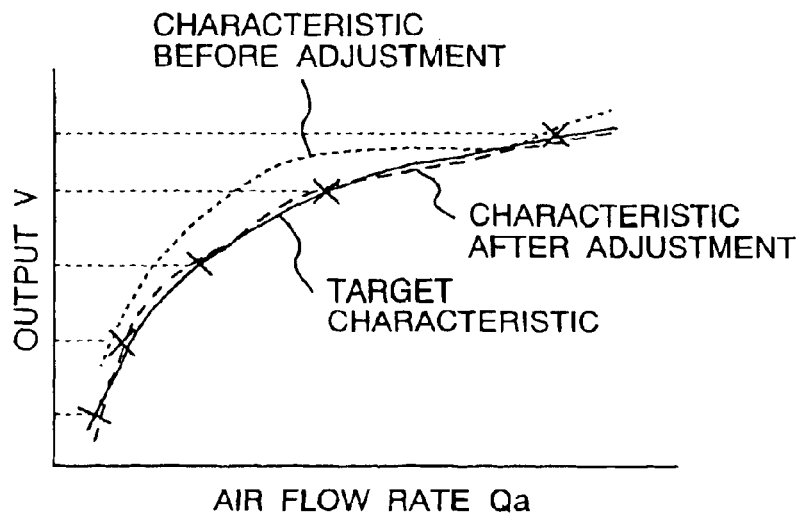
FIG. 5 is charts showing the output characteristic of the first embodiment before and after the output adjustment.
Figure 6:
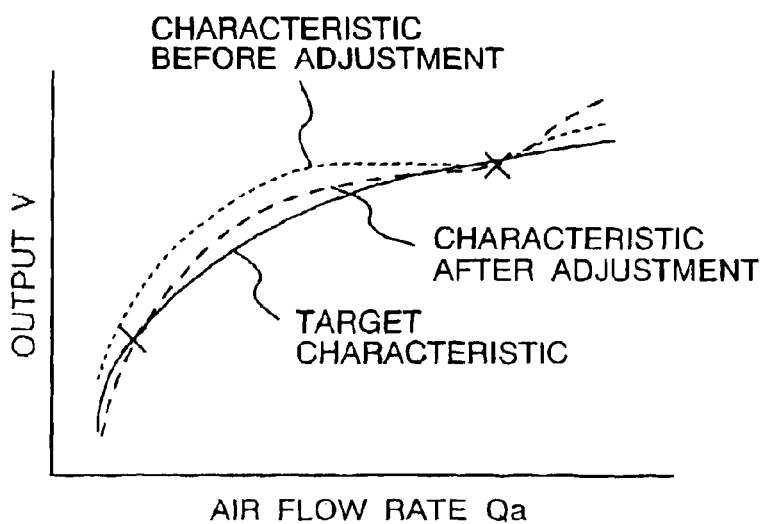
FIG. 6 is charts showing the output characteristic before and after output by the conventional laser trimming method.

According to this embodiment, in place of the laser trimming method, the output adjustment (calculation of correction coefficients) and the output correction after adjustment are executed on the basis of a calculation expression of a multidimensional polynomial expression, so that as shown in FIG. 5, the output characteristic can be brought extremely close to the target characteristic, and adjustment more accurate than that of the conventional output characteristic (FIG. 6) is enabled, and the measurement accuracy of the air flowmeter can be improved.

Moreover, the adjustment elements can be reduced compared with the analog adjustment circuit, and the circuit composition can be simplified.

Figure 7:
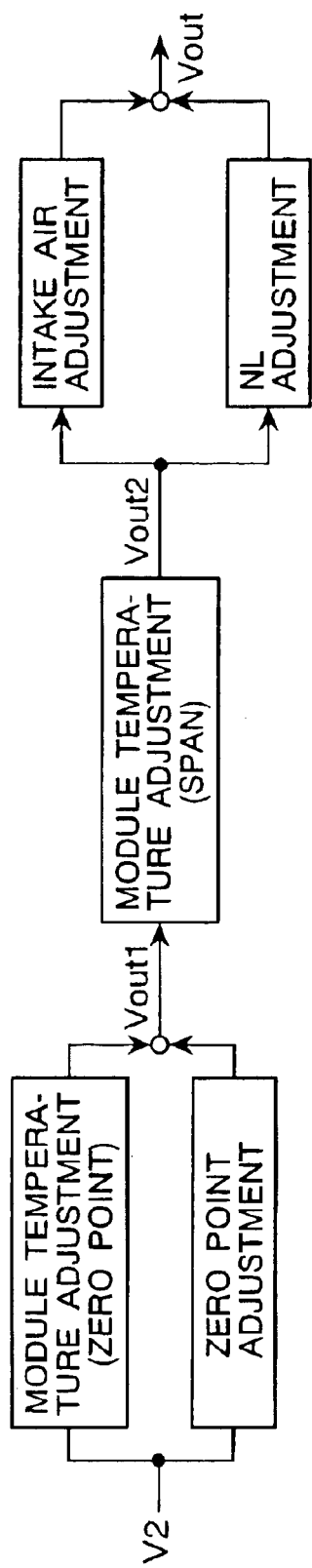
FIG. 7 is a function block diagram of a calculation circuit for executing output adjustment and output correction relating to another embodiment of the present invention.

Further, in the aforementioned embodiment, as shown in FIG. 2, the module temperature Tm and the intake air temperature Ta are added to the adjustment function of the output V2. However, when the correction circuit unit 10 having the circuit adjustment temperature sensor 12 is arranged in the intake air path, the module temperature Tm is almost equal to the intake air temperature practically, so that even if the intake air temperature Ta is deleted from the output adjustment elements, a highly accurate air flowmeter can be realized. In this case, the output adjustment function of the DSP 16 may be indicated as shown in FIG. 7.

The calculation expression in this case is expressed by Expression (7).

$$Vout1 = V2 + (k1 + k2*Tm + k3*Tm*Tm)$$

$$Vout2 = (1 + k4*Tm + k5*Tm*Tm)*Vout1$$

$$Vout = k6*Vout2 + k7*Vout2*Vout2 + k8*Vout2*Vout2*Vout2 \quad (7)$$

Wherein k1 indicates a correction coefficient of the zero point adjustment, and K2 and K3 indicate correction coefficients of the module temperature used for the zero point adjustment, and K4 and K5 indicate correction coefficients of the module temperature used for the span adjustment, and K6 to K8 indicate correction coefficients used for the nonlinear adjustment.

Further, in the aforementioned embodiment, the output characteristic of the air flowmeter is adjusted and corrected by a multidimensional polynomial expression. However, in place of it, as shown in FIG. 9, even if map data concerning air flow rate—output characteristic is prepared, and the region of the map data is divided, and an output characteristic correction expression to be changed for each air flow rate region is prepared, and the air flow rate is calculated, an air flowmeter more accurate than the conventional one can be realized.

Figure 9:
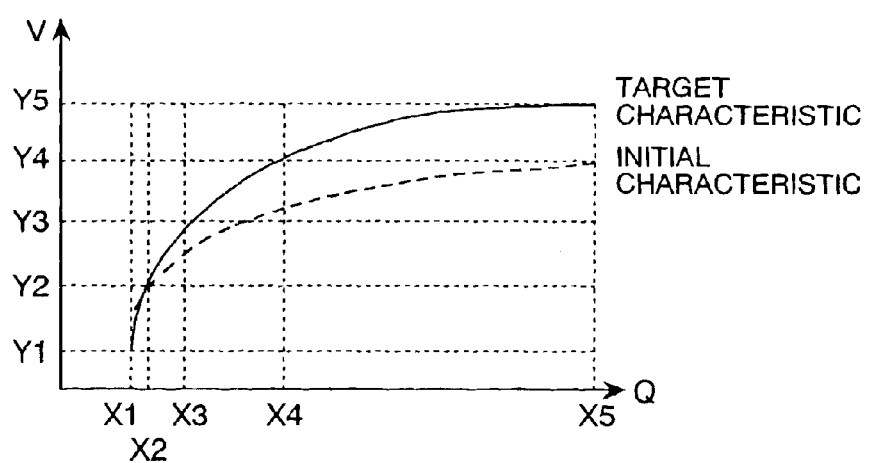
FIG. 9 is a drawing showing map data of the output adjustment method (output correction method) relating to another embodiment of the present invention.

FIG. 9 shows a principle diagram of this method (region dividing method), and the solid line in the drawing indicates a target output characteristic, and the dashed line indicates an initial output characteristic. The air flow rate region is divided into, for example, an interval between X1 and X2, an interval between X2 and X3, an interval between X3 and X4, and an interval between X4 and X5 (the number of divisions is not limit to this), and the output adjustment and correction calculation expression in this case is expressed, for example, by a linear expression of Vout=aV2+b, and a and b are correction coefficients. a is equivalent to a span correction coefficient and b is equivalent to a zero point correction coefficient.

From the aforementioned calculation expression, most suitable correction coefficients a and b are calculated according to the trend of the output characteristic in each divided region, and for example, in the region between X1 and X2, the calculation expression is expressed by Vout1=a1V2+b1, and in the region between X2 and X3, the calculation expression is expressed by Vout2=a2V2+b2, and in the region between X3 and X4, the calculation expression is expressed by Vout3=a3V2+b3, and in the region between X4 and X5, the calculation expression is expressed by Vout4= a4V2+b4, and these correction coefficients are stored in the PROM 21 of the same circuit as that shown in FIG. 1, and in this case, the DSP 16 changes the output characteristic correction expression (correction coefficients a and b) for each air flow rate region and calculates the air flow rate.

Further, with respect to the output adjustment (correction coefficients a and b), in the same way as with the flow chart shown in FIG. 3, at first, the initial output data calculated by the initial coefficients a and b before adjustment is input to an external computer as sample data between two points in each divided region, and the most suitable correction coefficients (a1, b1), (a2, b2), (a3, b3), and (a4, b4) in each divided region are calculated, and these correction coefficients are stored in the PROM 21 as map data in association with region decision data (Q1, Y1), (Q2, Y2), (Q3, Y3), and (Q4, Y4) . . . .

Further, with respect to region division of the map data, the change rate of the output characteristic of the air flow rate in the low flow rate region is higher than that in the high flow rate region, so that the low flow rate region is divided more finely than the high flow rate region so as to make the adjustment and correction of the output characteristic finer.

Figure 10:
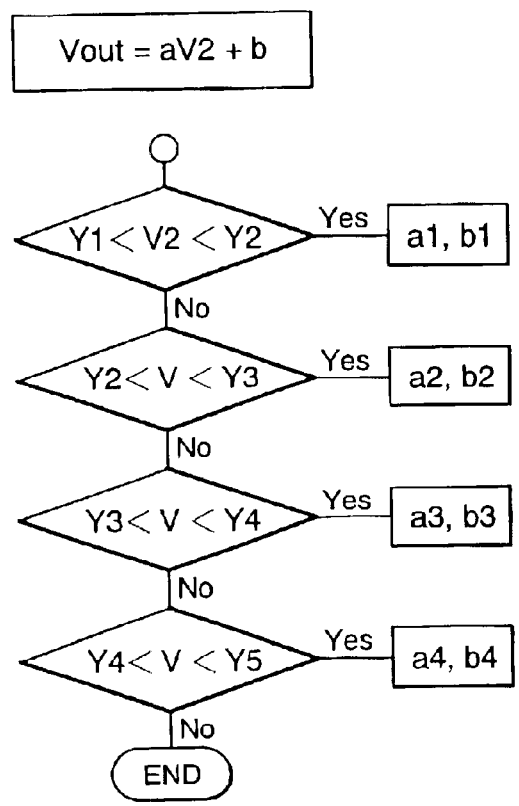
FIG. 10 is a flow chart of the output adjustment of the embodiment shown in FIG. 9.

The wired-in circuit composition in this embodiment is basically the same as that shown in FIG. 1 and the calculation method of the DSP 16 is different. The correction operation executed by the DSP 16 in this case is shown in FIG. 10.

With respect to the correction coefficients used in the correction expression of the air flowmeter after adjustment, depending on whether the output V2 is in the decision region between Y1 and Y2, between Y2 and Y3, between Y3 and Y4, or beyond Y4, the corresponding correction coefficient (a1, b1), (a2, b2), (a3, b3), or (a4, b4) is calculated.

INDUSTRIAL APPLICABILITY

As mentioned above, according to the present invention, by a method in place of laser trimming and by a small-scale circuit composition, high accuracy of a thermal type air flowmeter can be realized.

What is claimed is:

1. A thermal air flowmeter, comprising a temperature-dependent heating resistance element arrangeable in an air flow path, a gauge circuit which includes said heating resistance element configured to provide an output having a nonlinear characteristic from which air flow rate is measurable, and a calculation circuit configured to calculate the difference of a nonlinear target output characteristic and a real output characteristic of said gauge circuit by a polynomial expression higher than a quadratic expression, and to correct the real output-characteristic by the calculated difference.

2. The flowmeter according to claim 1, wherein said polynomial expression is a multidimensional expression of one of a cubic expression to a quintic expression.

3. A thermal air flowmeter according to claim 2, wherein, comprising a temperature-dependent heating resistance element arrangeable in an air flow path, a gauge circuit which includes said heating resistance element configured to provide an output from which air flow rate is measurable, and a calculation circuit configured to correct an output characteristic by a polynomial expression higher than a quadratic expression, said calculation circuit including a circuit for executing zero point adjustment, span adjustment, and non-linear adjustment by a calculation expression sequentially or simultaneously, or for executing span adjustment and non-linear adjustment simultaneously after zero point adjustment, and said calculation circuit further including means for storing correction coefficients decided after said each adjustment.

4. The thermal air flowmeter according to claim 1, wherein said calculation circuit includes a circuit for executing zero point adjustment, span adjustment, and non-linear adjustment by a calculation expression sequentially or simultaneously, or for executing span adjustment and non-linear adjustment simultaneously after zero point adjustment, and said calculation circuit further including means for storing correction coefficients decided after said each adjustment.

5. The flowmeter according to claim 4, wherein said calculation circuit is configured to take in at least one of a module temperature and an intake air temperature as an adjustment element of said output characteristic.

6. The flowmeter according to claim 5, wherein said calculation circuit comprises a temperature sensor for detecting a chip temperature arranged in an IC chip, whereby said chip temperature is usable for temperature correction of said calculation circuit and air temperature correction.

7. The flowmeter according to claim 5, wherein said calculation circuit is configured to calculate said intake air temperature using output values at both ends of said heating resistance element as variables.

8. A thermal type air flowmeter, comprising a temperature-dependent heating resistance element arrangeable in an air flow path, a gauge circuit including said heating resistance element configured to provide an output from which air flow rate is measurable, map data of an air flow rate—output characteristic, wherein a region of the map data is divided and has a low flow rate region of the air flow rate that is more finely divided than a high flow rate region of the air flow rate, and a calculation circuit configured to change an output characteristic correction expression for each air flow rate region and thereby calculate the air flow rate.

9. A thermal air flowmeter, wherein said polynomial expression is a multidimensional expression of one of a cubic expression to a quintic expression comprising a temperature-dependent heating resistance element arrangeable in an air flow path, a gauge circuit which includes said heating resistance element configured to provide an output from which air flow rate is measurable, and a calculation circuit configured to correct an output characteristic of the gauge circuit by a polynomial expression higher than a quadratic expression.

* * * * *